April 5, 1960 W. C. ALEXANDER ET AL 2,931,168
VARIABLE STATOR ENGINE CONTROL SYSTEM
Filed May 24, 1955 2 Sheets-Sheet 1
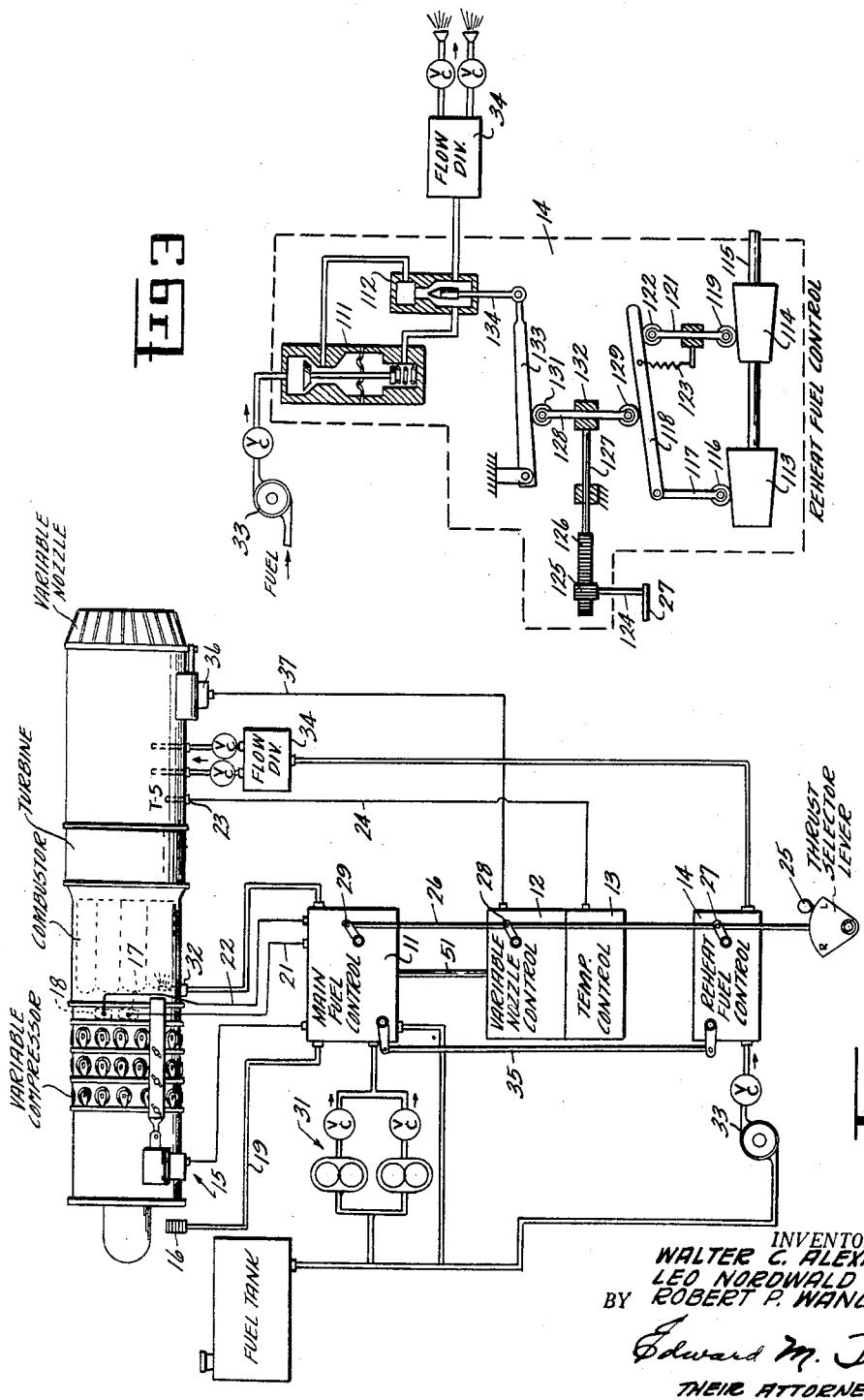
INVENTORS.
WALTER C. ALEXANDER
LEO NORDWALD
BY ROBERT P. WANGER
Edward M. Tittle
THEIR ATTORNEY—

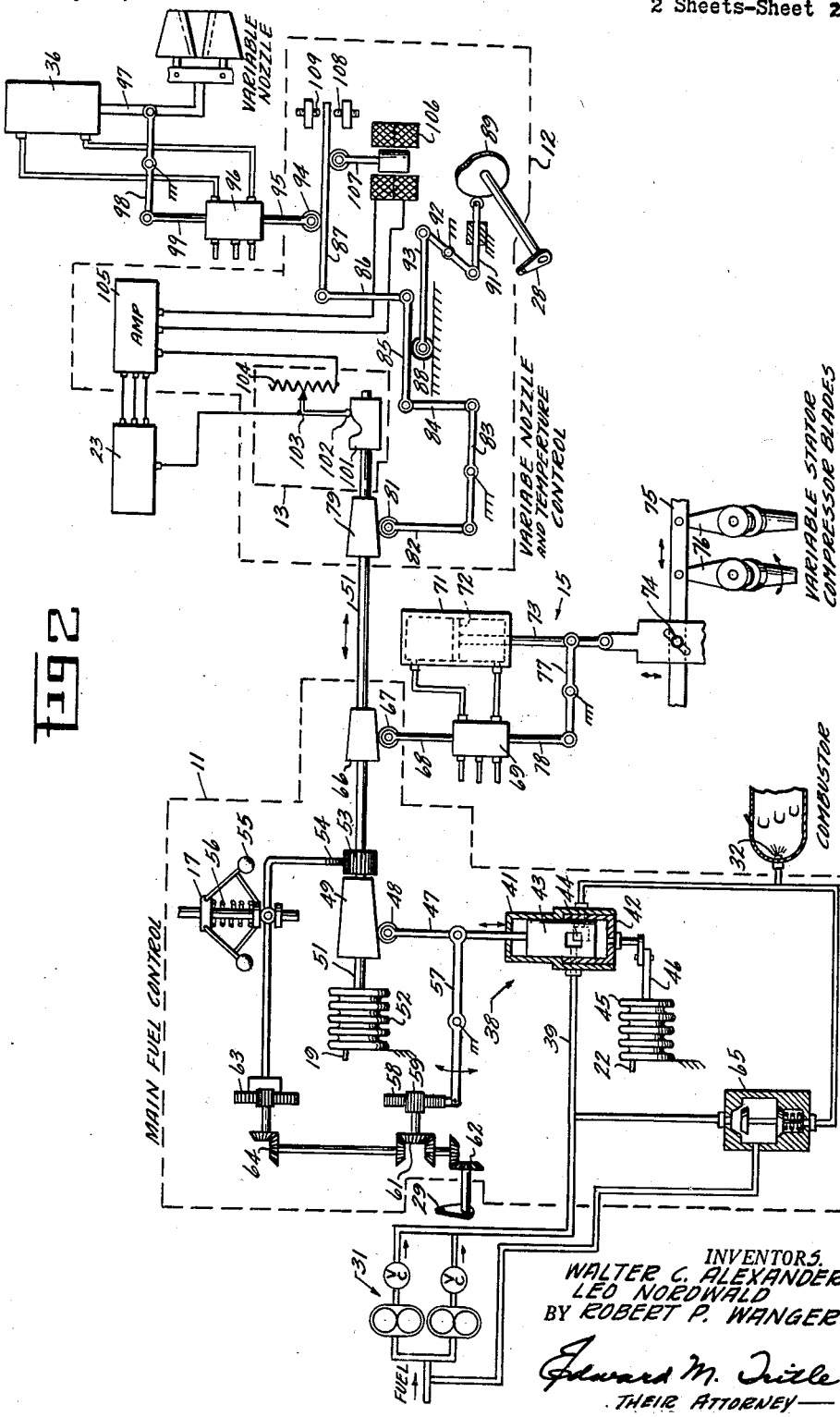

United States Patent Office 2,931,168
Patented Apr. 5, 1960

2,931,168
VARIABLE STATOR ENGINE CONTROL SYSTEM

Walter C. Alexander, Euclid, Robert P. Wanger, Sycamore Township, Hamilton County, and Leo Nordwald, Cincinnati, Ohio, assignors to General Electric Company, a corporation of New York Application May 24, 1955, Serial No. 510,608

7 Claims. (Cl. 60—35.6)

The present invention relates to a variable stator engine control system and, more particularly, to such a control system in which the sensed parameters of rotor speed, compressor inlet temperature, compressor discharge pressure and turbine discharge temperature are utilized as control inputs to obtain desirable control operation of a variable stator jet engine.

The engine control of the present invention acts to obtain optimum specific fuel consumption in the sub-military thrust range; to achieve maximum output of the dry engine at military power settings; at augmentation power settings, to provide thrust modulation on a minimum specific fuel consumption basis; and to achieve maximum output of the augmented engine at maximum power. In the performance of these operations, the control variables of speed, jet nozzle area, main and afterburner fuel flows, and stator blade angle are set by the control in response to the position angle of the thrust selector lever, the sensed parameters, and measurements of the control variables. Speed (N) is set as a function of the thrust lever position. Jet nozzle area for dry engine at sub-military power settings is set as a function of thrust lever positions ($\alpha$) and compressor inlet temperature ($T_2$). Main fuel flow is controlled to hold constant speed and the variable stator blades are positioned as a function of speed and compressor inlet temperature. At military and augmented power settings the jet nozzle area is controlled by thrust selector lever position and compressor inlet temperature and is trimmed within safe limits by the turbine discharge temperature ($T_5$). At augmentation power settings the afterburner fuel flow is scheduled by the thrust selector lever position between minimum and maximum allowable blow-out limits which are functions of compressor discharge pressure ($P_3$).

An object of the present invention is the provision of a reliable and efficient control system for a variable stator jet engine.

Another object is the provision of a variable stator control system in which the stator blades are positioned as a function of the two independent variables of engine speed and compressor inlet temperature.

An additional object is to provide a control system for a variable stator jet engine which achieves optimum specific fuel consumption by scheduling jet nozzle area as a function of the independent variables of speed and compressor inlet temperature.

Another object is to provide a control system for a variable stator jet engine which obtains maximum reliability during afterburner operation by scheduling jet nozzle area as a function of speed, compressor inlet temperature and thrust selector lever position, to be trimmed within safe limits by turbine discharge temperature.

Other objects and many of the attendant advantages of this invention will be readily appreciated as the same becomes better understood by reference to the following detailed description when considered in connection with the accompanying drawings wherein:

Fig. 1 is a diagrammatic view of a variable stator control system according to the present invention.

Fig. 2 is a schematic view showing the details of construction of the main fuel control, the variable stator control and the variable nozzle and temperature controls.

Fig. 3 is a schematic view of the afterburner fuel control.

Referring more particularly to Fig. 1 of the drawing, the control system of the present invention consists of the main fuel control 11, the variable nozzle control 12, the temperature control 13, the reheat fuel control 14, and the variable stator control 15. A temperature sensing means 16 is positioned at the inlet of the compressor, the speed sensing means 17 is connected to the compressor rotor and a pressure sensing means 18 is positioned at the discharge end of the compressor. Each of the sensing means 16, 17 and 18 is connected to the main fuel control and transmits measurements of the sensed engine parameters thereto through the leads 19, 21 and 22, respectively. Another temperature sensing means 23 is positioned at the discharge end of the turbine and transmits measurements of turbine discharge temperature to the temperature control 13 through the lead 24. The pilot's thrust selector lever 25 is connected to the afterburner fuel control, the variable nozzle control and the main fuel control by any suitable means, such as, the rod 26 and the arms 27, 28, 29, for transmitting indications of the position angle of the lever thereto. The main fuel control is connected into the fuel line between the main fuel pump 31 and the injectors 32. The reheat fuel control is connected into the afterburner fuel line between the afterburner fuel pump 33 and the flow divider 34. The reheat fuel control is further connected to the main fuel control by means of the mechanical linkage 35 to receive measurements of the compressor discharge pressure. The variable nozzle control and the temperature control are positioned adjacent the main fuel control and are connected thereto by means of the shaft 51. The variable nozzle control is also operatively connected to the jet nozzle actuator 36 by means of the lead 37.

As shown in Fig. 2 of the drawing, the main fuel control 11 includes a metering valve 38 connected into the main fuel line 39. For the purposes of illustration, the metering valve 38 is shown to consist of an outer casing 41 in which is positioned an axially movable member 43 and an overlapping rotatable member 42. Each of the members 42 and 43 is provided with a rectangular opening, the overlapping portions of which define a metering port 44, both dimensions of which are variable. A bellows 45 is connected to the rotating member 42 of the metering valve by a rod 46 in such a manner as to impart rotational movement thereto. The upper end of the axially movable member 43 is attached to a rod 47 having a cam follower 48 at its opposite end in contact with a three-dimensional cam 49. A bellows 52 is attached to the end of a shaft 51, upon which the cam 49 is mounted, such that contraction or expansion of the bellows results in axial movement of the shaft 51. A speed responsive means, such as the fly-ball governor 17, is operatively connected to the cam 49, such as by the spur gear 53 and rack 54, such that the travel of the governor weights 55 against the action of the spring 56 results in rotational movement of the cam 49. A rod 57 pivoted intermediate its length, is connected at one end to the rod 47 and is provided at its other extremity with a rack 58 which meshes with the gear 59 driven by the differential gear system 61. Rotational movement in one direction is applied to the differential 61 in response to movement of the thrust selector lever through the arm 29 and the bevel gears 62, while rotational movement in the opposite direction is applied in response to the travel of the governor weights 55 through the rack and gear assembly 63 and the bevel gears 64. The application of these two motions to the differential results in pivotal movement of the rod 57 which is transmitted to the rod 47. The main fuel control is completed by a by-pass valve 65 positioned between the main fuel pump and the metering valve to maintain pressure differential across the metering valve.

The variable stator control 15 includes a cam 66 affixed to the cam shaft 51 and positioned in the same manner as the cam 49. A cam follower 67 is attached to a rod 68, movement of which opens or closes the pilot valve 69 allowing hydraulic fluid to flow into the actuator 71. The hydraulic fluid within the actuator 71 acts against one side or the other of the piston 72 causing axial motion of the piston rod 73. This axial movement of the rod 73 is transmitted through the pin and slot arrangement 74 to the hoop 75 which moves the actuator arms 76 and positions the stator blades. Movement of the rod 73 is fed back through links 77 and 78 to readjust the setting of the pilot valve 69.

The variable nozzle control 12 includes a three-dimensional cam 79 affixed to the cam shaft 51 and positioned in the same manner as cams 49 and 66. A cam follower 81 is supported at one end of a link 82, the opposite end of which is attached to the intermediately pivoted member 83. A link 84 joins the opposite extremity of member 83 with one end of member 85, while another link 86 joins the opposite end of member 85 to one end of member 87. The member 85 is supported by a roller 88 which provides a fulcrum point about which the member 85 pivots. The roller 88 is positioned lengthwise of member 85 in response to movements of the thrust selector lever through the action of cam 89, follower 91 and links 92 and 93. A follower 94 rides on the upper surface of the member 87 and is attached to a rod 95 which controls the pilot valve 96, allowing hydraulic fluid to flow into the actuator 36. The hydraulic fluid within the actuator bears against a piston (not shown) which moves the rod 97 and operates the variable nozzle. Movement of the rod 97 is fed back to the pilot valve 96 through links 98 and 99 to readjust the pilot valve.

The temperature control 13, as shown in Fig. 2, includes a cam 101 which receives axial movement only from the cam shaft 51. A cam follower 102 rides on the cam 101 and is connected to the movable arm 103 of potentiometer 104 which is connected in series with the turbine discharge temperature sensor 23 and the amplifier 105, the amplifier 105 being also directly connected to the sensor 23. The amplifier 105 is further connected to a solenoid 106 having an arm 107 which bears against the under surface of member 87 and positions it selectively between the stops 108 and 109.

As shown in Fig. 3, the reheat fuel control 14 includes a throttling valve 111 and a metering valve 112 connected into the afterburner fuel line between the afterburner fuel pump 33 and the flow divider 34. A pair of cams 113 and 114 are mounted on the shaft 115 which is activated by the linkage 35, shown in Fig. 1, in response to measurements of compressor discharge pressure. A cam follower 116 bears against the surface of cam 113 and is attached to a link 117, the upper end of which is pivoted to member 118, and a cam follower 119 bears against the surface of cam 114 and is attached to one end of link 121, the upper end of which is provided with a follower 122 which bears against the lower surface of member 118, member 118 being biased by spring 123 to remain in constant contact with follower 122. The arm 27, which is controlled by movements of the pilot's thrust selector lever, is secured to one end of a shaft 124 having a gear 125 at its opposite end which meshes with a rack 126 on the axially movable member 127. A link 128 having a pair of followers 129 and 131 at its opposite extremities is connected to the end of member 127 removed from the rack 126 by a guide, which constrains link 128 to move in a direction normal to member 127. The follower 129 bears against the upper surface of member 118 while the follower 131 bears against the lower surface of pivoted member 133, the opposite end of which is connected to the rod 134 which controls metering valve 112.

In the operation of the main fuel control, the fuel from the pump 31 is supplied to both the metering valve 38 and the by-pass valve 65. The amount of flow necessary to create the pressure drop required by the setting of the by-pass valve becomes metered and passes through the fuel line to the nozzle 32. The excess fuel is returned to the pump inlet by the by-pass valve. The pressure drop across the metering valve is held constant and both transient and steady state fuel flows are accomplished by varying the size of the metering area 44, as dictated by the engine parameters of engine speed (N), compressor inlet temperature ($T_2$), and compressor discharge pressure ($P_3$). The control of maximum limited fuel flow during an acceleration is a function of all three parameters. During a deceleration, the minimum limited fuel flow is controlled only by compressor discharge pressure due to a minimum stop adjustment which provides a fixed axial position of the metering valve in the closed direction.

Steady state operation throughout the operating range from idle to maximum power is accomplished through a governor responsive to engine speed which in combination with thrust selector lever position controls fuel flow between the minimum and maximum limits. Power variation is accomplished by movement of the thrust selector lever.

The speed signal N, as derived from the rotor shaft by the governor 17, is used in two separate systems—one being used for governing during steady state and the second for providing a speed sense in combination with inlet temperature to limit the axial dimension of the metering valve for transient operation. In the latter system, the speed sensing means 17, through the action of the rack 54 and gear 53, determines the rotational position of the cam shaft 51 which carries the three-dimensional acceleration limit cam 49. The acceleration cam is also positioned axially as a function of compressor inlet temperature $T_2$ by the bellows 52. Being three-dimensional in contour, the acceleration cam 49, through rod 48, limits the metering valve travel axially for each independent value of N and $T_2$. Thus the axial travel of the valve is equal to $f(N, T_2)$. The rotational position of the metering orifice 44 is determined by the bellows 45 in response to measurements of compressor discharge pressure $P_3$. The maximum area of metering orifice 44 is thus limited to $f[f(N, T_2), P_3]$. In the steady state operation, the speed signal is applied to the differential 61 by means of the rack and gear assembly 63 and bevel gears 64. At the same time the position angle of the thrust selector lever is also applied to the differential through the bevel gears 62. The difference between these two signals, which is the difference between the actual speed and the desired speed, causes the arm 57 to move in the direction of the arrows, thus varying the adjustment of the metering valve 38 and correcting actual speed to desired speed.

In the operation of the variable stator control 15 the cam 66 controls the pilot valve 69 through the follower 67 and arm 68 as a function of N and $T_2$ to admit hydraulic fluid to one end or the other of the actuator 71, thereby moving arm 73 which in turn moves hoop 75 to adjust actuator arms 76, and set the desired position of the variable stator blades. The feedback through links 77 and 78 provides a fine adjustment of the pilot valve and permits close control of the position of the stator blades. The stator blades may be positioned as a function of corrected speed and at particular flight conditions may be positioned as functions of the independent variables of N and $T_2$ in order to obtain maximum engine output.

In the variable nozzle control, the cam 79 feeds a function of N and $T_2$ into the linkage through the follower 81. The roller 88 is set in accordance with values of thrust selector lever position angle by means of the cam 89 such that the output of member 85 is a $$f(T_2, N) \times f(\alpha)$$

Turbine discharge temperature ($T_5$) trim is fed into the member 87 by means of the solenoid 106. The input to pilot valve 96 then becomes $[f(T_2, N) \times f(\alpha)]$, $+T_5$ trim, and the valve is controlled by this value to admit hydraulic fluid to actuator 36 which imparts motion to the rod 97 to control the variable jet nozzle area. The feedback through links 98 and 99 acts similarly to that of the stator blade control to permit close control of the jet nozzle area.

Values of turbine discharge temperature ($T_5$) are fed into the potentiometer 104, which is controlled by the cam 101 which is in turn adjusted by values of $T_2$, such that the output of the potentiometer becomes a function of $T_2$ which is used as a reference signal. This signal is fed into the amplifier 105. Values of $T_5$ are also fed directly to the amplifier 105 where they are compared with the reference signal. A $T_5$ error signal is then fed to the solenoid 106 which provides $T_5$ temperature trim input to the nozzle control signal.

The afterburner fuel control meters fuel flow to the afterburner using compressor discharge pressure $P_3$ as a metering parameter modulated by thrust selector lever position angle. Metering head is held constant across the metering valve by the throttling valve and fuel flow is controlled by varying the metering valve area. The minimum and maximum fuel flow limits are controlled as a unique function of compressor discharge pressure $P_3$. Selector lever movement provides a selection of any fuel flow between these limits. For any fixed selector lever position the fuel flow will be a fixed ratio between the minimum and maximum fuel flow limits and will vary as they do with changes in $P_3$ pressure. Positioning of the metering valve to these parameters is accomplished by employing two cams 113 and 114, one cam contoured to produce the maximum fuel flow limit and the other cam contoured to give the required minimum fuel flow limit. The cams are rotated as a straight line function of $P_3$ pressure. The cam displacements result in a linear travel of the cam followers 116, 119. The cam followers dictate the slope of an inclined plane 118. The amount of incline in the plane then becomes a function of a ratio of minimum fuel flow to maximum fuel flow as determined by the $P_3$ sensitive cams. The thrust selector lever positions a follower 129 on the inclined plane and the metering valve is positively positioned by the follower 131 through linkage 133, 134. It is possible, therefore, by advancing the thrust selector lever to pick off an infinite number of part selector lever positions, and each corresponding fuel flow will be a function of the existing lever position angle and the compressor discharge pressure.

The various elements shown in the servo controls of the present system are not illustrative of actual structure but are purely diagrammatic merely to show function.

Obviously many modifications and variations of the present invention are possible in the light of the above teachings. It is, therefore, to be understood that within the scope of the appended claims, the invention may be practiced otherwise than as specifically described.

What we claim is:

1. In a turbojet engine, including a variable stator blade compressor, a variable area jet nozzle, a main fuel supply system and a rotor speed governor, a control system comprising: a temperature sensor positioned in the compressor inlet; a pressure sensor positioned in the compressor discharge; another temperature sensor positioned in the turbine discharge; manually controllable means operatively connected to the governor and the jet nozzle for initially setting engine speed and jet nozzle area; means connected to said manually controllable means and to the last mentioned sensor for limiting jet nozzle area by turbine discharge temperature; means connected to the fuel supply system and to the governor, compressor inlet temperature sensor and compressor discharge pressure sensor for automatically controlling fuel flow during transient operation of the engine; and means connected to said last mentioned means and to the compressor stator blades for varying the settings thereof; whereby operation of the engine is controlled by the engine parameters of rotor speed, compressor inlet temperature, compressor discharge pressure and turbine discharge temperature.

2. In a turbojet engine including a variable stator blade compressor, a variable area jet nozzle, a main fuel supply system and a rotor speed governor, a control system comprising: a temperature sensor positioned in the compressor inlet; a pressure sensor positioned in the compressor discharge; another temperature sensor positioned in the turbine discharge; manually controllable means operatively connected to the governor and the jet nozzle for initially setting engine speed and jet nozzle area; means connected to a portion of said manually controllable means and to the last mentioned sensor for limiting jet nozzle area by turbine discharge temperature; means connected to another portion of said manually controllable means and to the fuel supply system and the governor, compressor inlet temperature sensor and compressor discharge pressure sensor for automatically controlling fuel flow during transient operation of the engine; and means connected to said last mentioned means and to the compressor stator blades for varying the settings thereof; whereby operation of the engine is controlled by the engine parameters of rotor speed, compressor inlet temperature, compressor discharge pressure and turbine discharge temperature.

3. For use in a variable stator turbojet engine having a main fuel supply system and a rotor speed governor, a control system for controlling the main fuel supply and for positioning the compressor stator blades including: a compressor inlet temperature sensor; compressor discharge pressure sensor; fuel control means including a first cam mounted on a cam shaft, said control means being connected to said sensors and adapted to be connected to said governor and said supply system for controlling the flow of fuel to the engine as a function of compressor inlet temperature, compressor discharge pressure and rotor speed; and a variable stator blade control including a second cam mounted on said cam shaft, said variable stator control being adapted to be connected to the compressor stator blades for varying the setting thereof as a function of rotor speed and compressor inlet temperature.

4. For use in a turbojet engine having a variable stator blade compressor, a variable area jet nozzle and a main fuel system, a control system, including: a main fuel control, variable stator blade control, and a jet nozzle control each including a three-dimensional cam mounted on a common cam shaft; a compressor inlet temperature sensor and an engine speed sensor, each of said sensors being operatively connected to the cam shaft; whereby the cams are positioned as a function of compressor inlet temperature and engine speed, thereby controlling the position of the stator blades, the main fuel flow and the area of the jet nozzle as functions of the same engine parameters.

5. For use in a turbojet engine having a variable stator blade compressor, a variable area jet nozzle and a main fuel system, a control system, including: a main fuel control, variable stator blade control, and a jet nozzle control each including a three-dimensional cam, each of said cams being mounted on a common cam shaft; a compressor inlet temperature sensor operatively connected to the cam shaft to impart axial motion thereto; an engine speed sensor operatively connected to the shaft to impart rotational motion thereto; whereby the cams are controlled as a function of compressor inlet temperature and engine speed, thereby actuating the controls to control the position of the stator blades, the main fuel flow and the area of the jet nozzle as functions of the same engine parameters.

6. For use in a turbojet engine having a variable stator blade compressor, a variable area jet nozzle and a main fuel system, a control system, including: a main fuel control, variable stator blade control, and a jet nozzle control, each including a three-dimensional cam, each of said cams being mounted on a common cam shaft; a compressor inlet temperature sensor operatively connected to the cam shaft for imparting axial motion thereto; an engine speed sensor operatively connected to the cam shaft for imparting rotational motion thereto, thus positioning the shaft and the cams as a function of compressor inlet temperature and engine speed; a compressor discharge pressure sensor connected to said main fuel control; a turbine discharge temperature sensor connected to said jet nozzle control; whereby main fuel flow is controlled as a function of compressor inlet temperature, engine speed and compressor discharge pressure, position of the stator blades is controlled as a function of compressor inlet temperature and engine speed, and the area of the jet nozzle is controlled as a function of compressor inlet temperature and engine speed and trimmed within safe limits by turbine discharge temperature.

7. For use in a turbojet engine having a variable area jet nozzle and a thrust selector lever, a jet nozzle control, including: a compressor inlet temperature sensor; and engine speed sensor; means connected to said sensors and responsive to measurements of compressor inlet temperature and engine speed for generating a signal equal to a function of compressor inlet temperature combined with engine speed; means adapted to be connected to the thrust selector lever and operatively connected to said first named means for multiplying said signal by a quantity equal to a function of lever position angle to produce a modified signal; actuator means adapted to be connected to the jet nozzle; means connected to the first named means and to said actuator for transmitting the modified signal thereto; and means responsive to measurements of turbine discharge temperature connected to said last named means for limiting the modified signal; whereby the jet nozzle area is controlled as a function of compressor inlet temperature, engine speed and lever position angle and limited by turbine discharge temperature.

References Cited in the file of this patent

UNITED STATES PATENTS

| | | |
|---|---|---|
| 2,670,599 | Davies et al. | Mar. 2, 1954 |
| 2,705,590 | Lovesey et al. | Apr. 5, 1955 |
| 2,759,549 | Best | Aug. 21, 1956 |
| 2,763,986 | Block | Sept. 25, 1956 |
| 2,822,666 | Best | Feb. 11, 1958 |

FOREIGN PATENTS

| | | |
|---|---|---|
| 687,498 | Great Britain | Feb. 18, 1953 |